United States Patent

[11] 3,584,185

| [72] | Inventors | Leonard E. Mann<br>Norwich;<br>Leonard Mauskapf, Groton; Russell J. Nickerson, Mystic; Petros T. Petrides, Norwich, all of, Conn. |
|---|---|---|
| [21] | Appl. No. | 596,128 |
| [22] | Filed | Nov. 22, 1966 |
| [45] | Patented | June 8, 1971 |
| [73] | Assignee | General Dynamics Corporation<br>New York, N.Y. |

[54] ARC WELDING SYSTEM AND PROCESS
5 Claims, 6 Drawing Figs.

[52] U.S. Cl. ..................................................... 219/131, 219/130
[51] Int. Cl. ........................................................ B23k 9/10
[50] Field of Search ........................................... 219/131 (F,R), 137, 130, 60.1

[56] References Cited
UNITED STATES PATENTS

| 3,019,329 | 1/1962 | Zeller | 219/131 |
| 3,118,051 | 1/1964 | Dixon | 219/137X |
| 3,390,250 | 6/1968 | Ablett et al. | 219/137X |
| 3,339,107 | 8/1967 | Aldenhoff | 219/131X |
| 3,281,572 | 10/1966 | Oku et al. | 219/131 |

Primary Examiner—Joseph V. Truhe
Assistant Examiner—J. G. Smith
Attorney—William C. Everett ABSTRACT: In the particular embodiment of the invention described herein, water and inert gas are first supplied to a welding torch to cool the torch and purge the torch of foreign matter. Thereafter, a high frequency high voltage signal is supplied across the gap between the electrode of the welding torch and a workpiece to ignite a welding arc therebetween. Once the arc has been ignited, the high frequency high voltage signal is disabled and a controlled and pulsating unidirectional current signal is supplied to the welding arc to accurately control the solidification of the metal in the weld. A controlled welding torch drive motor and a controlled wire feed motor are also provided for driving the welding torch around the workpiece and for feeding filler wire into the welding arc, respectively.

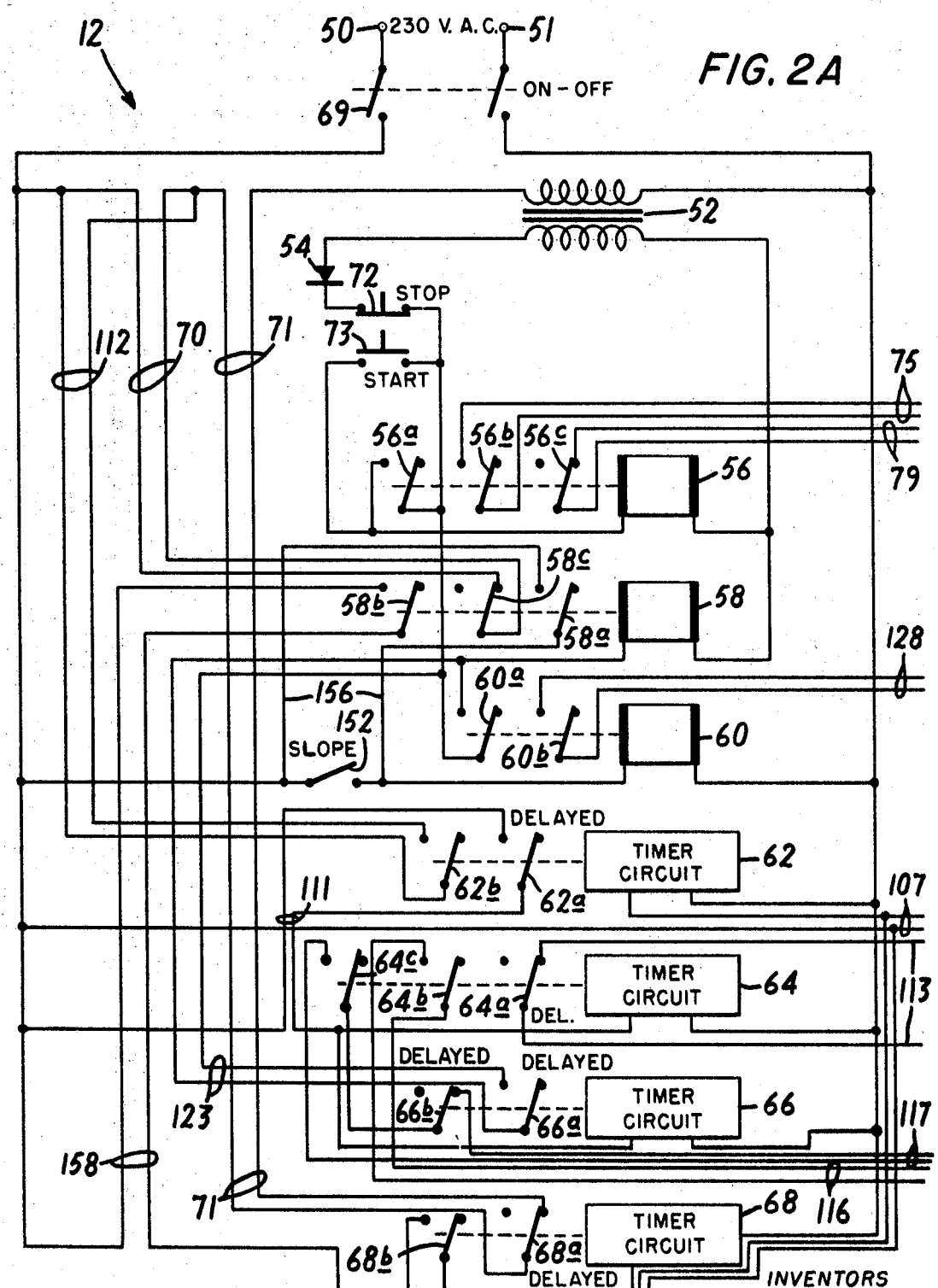

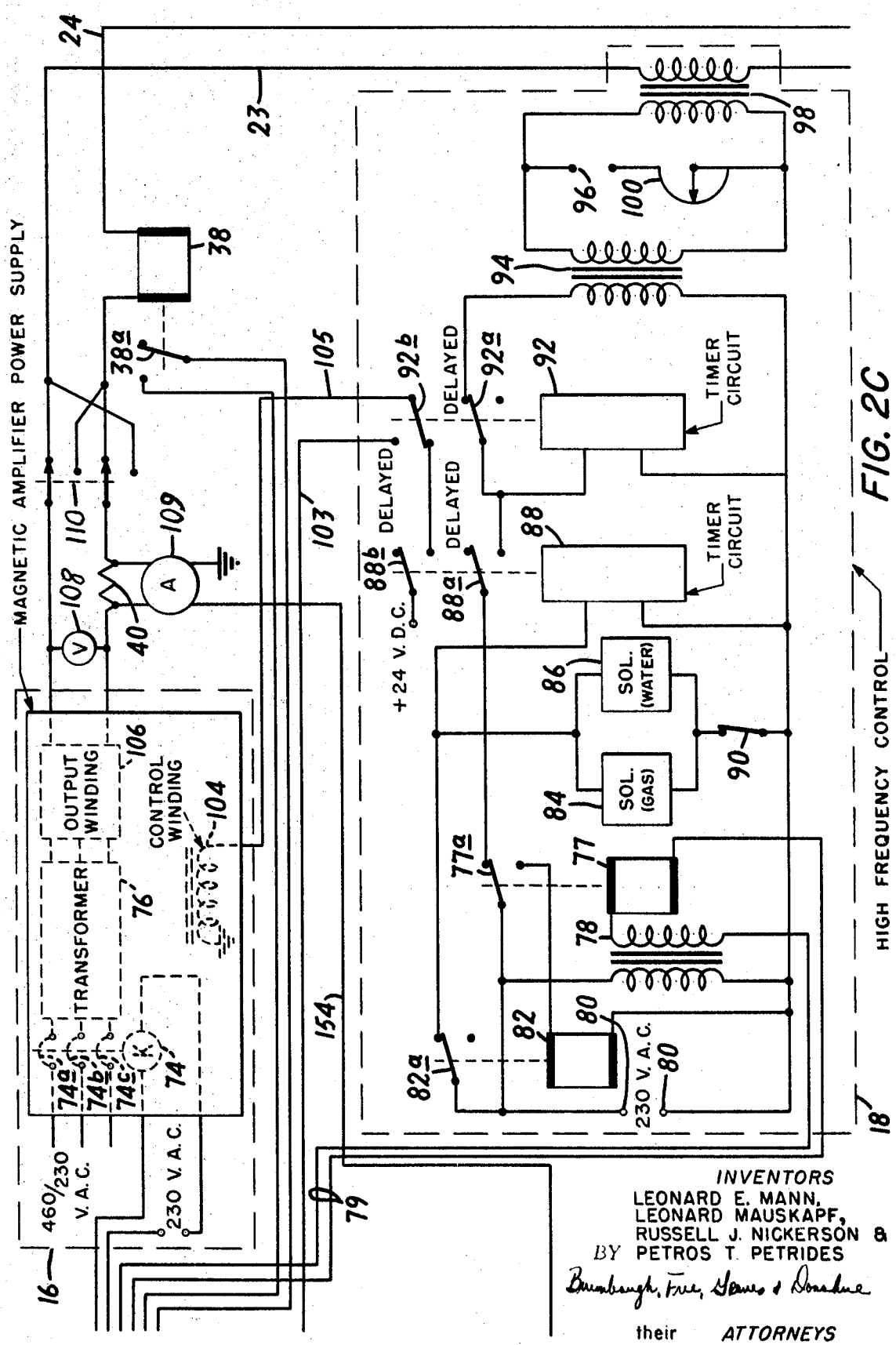

ARC WELDING SYSTEM AND PROCESS

This invention relates to arc welding systems and processes and, more particularly, to a nonconsumable electrode pulsed arc welding system and process.

In presently devised pulsed arc welding systems of the nonconsumable electrode type (TIG), current is supplied to a welding arc in the form of a background current level with superimposed pulses rather than in a steady state form. This has the effect of forming successive puddles of weld metal. These are used for out-of-position welding, i.e., positions where gravity would ordinarily cause molten weld metal to flow out of the weld puddle, as on the underside of a pipe in fixed position pipe welding. The successive puddles are small, relying on surface tension to overcome the force of gravity until the puddle solidifies. A disadvantage with many of these systems lies in the fact that the components provided for pulsating the arc, namely the weld power supply and the source of current pulses, are operated apart from and are not automatically integrated with the remainder of the system. Still other systems are manually operated, relying on the skill of the operator to achieve high quality weldments. The result is that the puddles are separate or overlapping, are generally irregularly spaced, and sacrifice the advantage which TIG welding possesses for out-of-position welding, because of their nonuniformity and discontinuity.

The present invention provides an automatic integrated pulsed arc TIG welding system and process producing a continuous puddle. The pulses are provided by periodically raising and lowering the current level according to a predetermined pattern. By periodically is here meant the mathematical characteristic that $i(t)=(t+T)$ where $T$ is the time period of the repeatable current pattern. Controlled along with the current pattern are the rate of travel along the weld and, if cold wire feed is used, the amount of weld metal supplied to the puddle. By this means, the electrode is advanced along the weld in a precise manner with a precise ratio of heat, weld metal, and weld path which insures that the puddle solidifies in a continuous wave rather than in discrete pools, notwithstanding that the current is provided in a periodic manner. The purpose of the pulses is to provide control within the puddle by preventing buildup of heat at any point sufficient to cause the gravity forces on the puddle to exceed the surface tension.

Accordingly, it is an object of the present invention to provide a pulsed arc nonconsumable electrode arc welding system which can be automatically or manually operated.

It is another object of the present invention to provide a pulsed arc nonconsumable electrode arc welding system wherein the components provided for pulsating the arc are operationally integrated with the remainder of the system.

It is still another object of the present invention to provide a pulsed arc nonconsumable electrode arc welding system which provides current pulses of suitable frequency and magnitude to stabilize the weld puddles to cause continuous solidification of the puddle along the path of travel of the welding torch.

It is yet another object of the present invention to provide a pulsed arc nonconsumable electrode welding process which provides puddle control by periodically raising and lowering current in a manner to cause a continuous wave of puddle solidification along the path of travel of the weld.

These and other objects of the present invention are accomplished by first supplying a preflow of water and inert gas to a welding torch to cool the torch and purge the torch of foreign matter and thereafter igniting a welding arc with a high frequency high voltage signal supplied across the gap between the electrode of the welding torch and a workpiece and sustaining the arc with a starting welding current supplied to the arc through the electrode of the welding torch. Once the arc has been ignited, provision is made for disabling the high frequency high voltage signal and the starting current and supplying a pulsating unidirectional current to the welding arc to control solidification of metal in the weld. Provision is also made for driving the welding torch around the workpiece and for feeding filler wire into the welding arc. At the end of the welding cycle which coincides with at least one complete revolution around the workpiece by the welding torch, provision is further made for gradually decreasing the magnitude of the pulsating current supplied to the welding arc to nearly zero in order to extinguish the arc and prevent pitting and porosity of the weld and terminating the rotational movement of the welding torch and the feeding of filler wire into the welding arc.

Further objects and advantages of the invention will be apparent from a reading of the following detailed description thereof taken in conjunction with the following drawings, in which:

FIG. 2A is a diagrammatic illustration of the timing control circuit employed in the FIG. 1 embodiment;

FIG. 2C is a diagrammatic illustration of the high frequency control circuit and the magnetic amplifier power supply employed in the FIG. 1 arrangement;

FIG. 3 is a block diagram illustrating the manner in which FIGS. 2A, 2B and 2C are connected.

Figure 1:
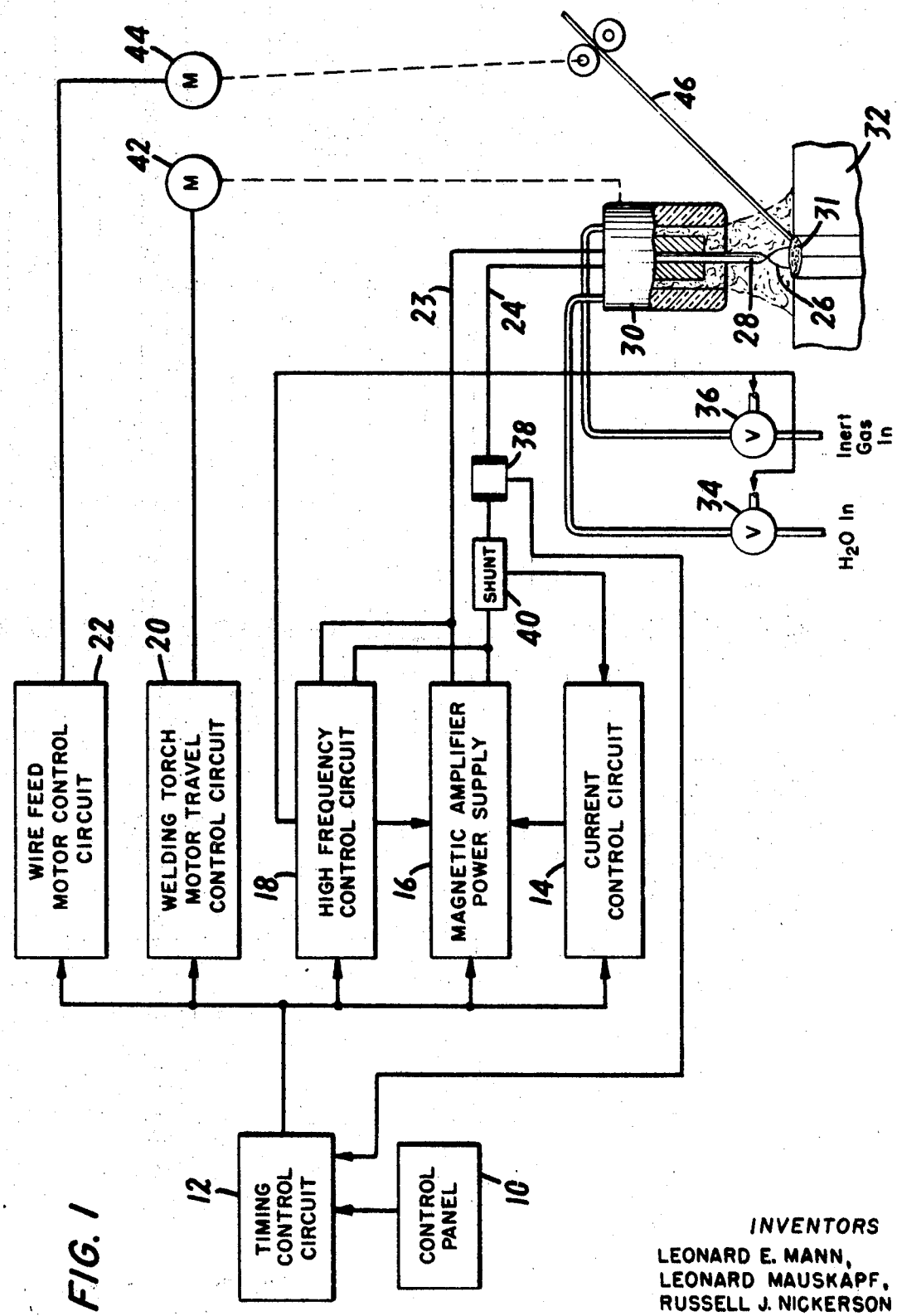
FIG. 1 is a schematic block diagram illustrating the arrangement of one embodiment of the invention.

In the illustrative embodiment of the invention, as shown in FIG. 1, a control panel 10 is provided which, although not shown, includes a plurality of toggle switches, push button switches, and potentiometers for initiating and controlling the operation of the instant invention. In the more detailed description of the present invention hereinbelow, the various components of the panel are shown adjacent the circuit elements with which they are related, not adjacent one another. This is done to simplify both the description and the understanding of the present invention. Coupled to the control panel 10 is a timing control circuit 12 which includes a plurality of timing and relay circuits for controlling the operation of a current control circuit 14, a magnetic amplifier power supply 16, a high frequency control circuit 18, a welding torch motor travel control circuit 20 and a wire feed motor control circuit 22.

The current control circuit 14 is adapted to supply either unidirectional current, sloping unidirectional current or pulsating unidirectional current to the control winding of the magnetic amplifier power supply 16. In response to the current supplied to its control winding from the current control circuit 14, the magnetic amplifier power supply 16 supplies output welding current proportional to the current flowing in the control winding through conductors 23 and 24 to a welding arc 26 established between the electrode 28 of a rotatable welding torch 30 and a puddle 31 of a workpiece 32. The high frequency control circuit 18, which also includes timing and relay circuits, controls the operation of a pair of valves 34 and 36 which control the flow of water and inert gas to the frame of the welding torch 30 and to the welding arc 26, respectively. The high frequency control circuit 18 is coupled to conductors 23 and 24 and further operates to supply a high frequency, high voltage signal across the gap between the electrode 28 and the workpiece 32 to thereby initiate the welding arc 26. The circuit 18 does not supply this arc igniting signal until after the frame of the welding torch 30 has been cooled and the welding arc area has been purged of all foreign matter, and especially oxygen and nitrogen, by the inert gas flowing through the valve 36.

When the high frequency control circuit 18 supplies the high voltage signal across the gap between the electrode 28 and the workpiece 32, it also disconnects the current control 14 from the control winding of the magnetic amplifier power supply 16 and connects a high level current into the control winding. This saturates the magnetic amplifier of the supply and a large current flow is produced in conductors 23 and 24 and supplied to the welding arc 26. Coupled in series with the conductor 24 is a weld current relay 38 which is energized by the high level output current. When the relay 38 is energized, it couples a control signal to a timing circuit within the timing control circuit 12 to start the actual welding cycle. Also included in the conductor 24 is a shunt resistor 40 which couples feedback signals to the current control circuit 14 to adjust the output of the circuit for any spurious changes in the welding current. When the arc igniting high voltage signal is terminated by the control circuit 18, the output of the current control circuit 14 is again connected to the control winding of the supply 16 and the high current source is disconnected.

The welding torch motor travel control circuit 20 and the wire feed motor control circuit 22 are activated by the timing control circuit 12 a preselected time after the weld current relay 38 is energized. When activated, the control circuits 20 and 22 supply energization current to a welding torch travel motor 42 and a wire feed motor 44, respectively. The motor 42 drives the welding torch 30 around the workpiece 32 while the motor 44 supplies filler wire 46 into the puddle 31. The control circuit 20 adjusts the speed of the motor 42 such that the welding torch 30 is driven to complete exactly one revolution around the workpiece 32 for a given welding cycle. The control circuit 22 adjusts the speed of the motor 44 such that the filler wire 46 is fed into the puddle 31 at a rate which will provide high quality weldments.

At the end of the welding cycle, which coincides with the completion of one revolution by welding torch 30 around the workpiece 32, the timing control circuit 12 disables the wire feed motor control circuit 22 to thereby stop the motor 44. A second control signal is supplied from the timing control circuit 12 to the current control circuit 14 which causes the control circuit 14 to supply a sloping unidirectional or pulsating current to the magnetic power supply 16. This, in turn, produces a uniformly decaying output welding current signal which results in the deenergization of the weld current relay 38 and the ultimate extinguishment of the welding arc 26. Gradually reducing the weld current is provided to prevent pitting and porosity of the weldment at the end of the welding cycle. The magnetic amplifier power supply 16 and the frequency control circuit 18 are also disabled at this time by the timing control circuit 12 and the valves 34 and 36 are closed by the high frequency control circuit 18.

Figure 2B:
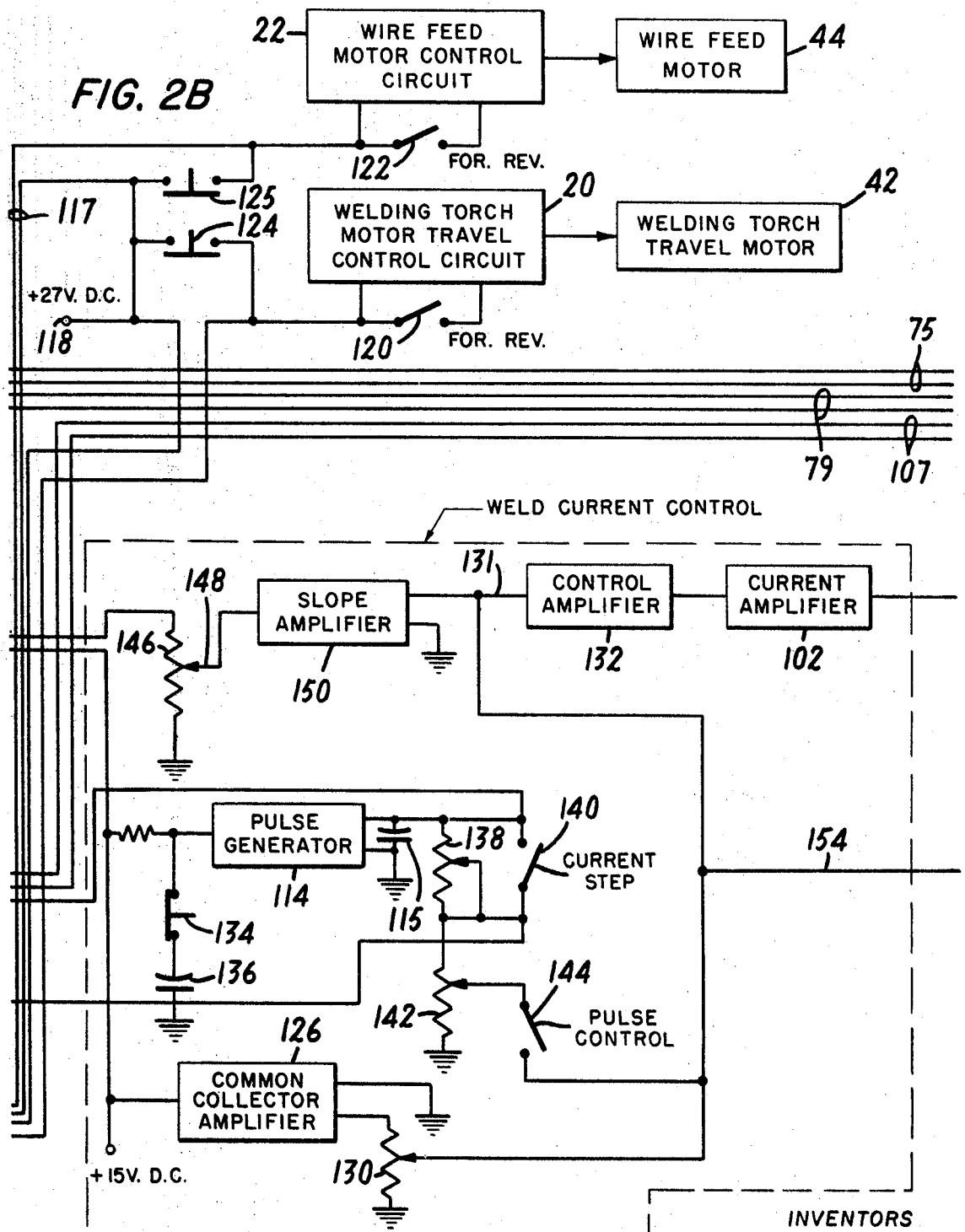
FIG. 2B is a diagrammatic illustration of the weld current control circuit and the welding torch and wire feed motor control circuits employed in the FIG. 1 embodiment.

For a more complete description of the present invention, reference may be had to FIGS. 2A, 2B and 2C, connected together as shown in FIG. 3, which diagrammatically illustrates the various circuit elements of the present invention. As shown in FIG. 2A, a 230 volt alternating current (AC) signal is applied across a pair of input terminals 50 and 51 which constitute the input terminals of the FIG. 1 timing control circuit 12. The timing control circuit 12 includes a transformer 52, a diode 54 coupled in series with the output winding of the transformer 52 and a relay 56 with its associated "C" contacts 56a, 56b and 56c. For the purposes of this description, all contacts will be shown in their unenergized normally closed "NC" or normally open "NO" states. Further included within the timing control circuit 12 are a relay 58 with associated "C" contacts 58a, 58b and 58c, a relay 60 with associated "C" contacts 60a and 60b, and a first timer circuit 62 having a delayed operation "C" contact 62a and an instant operation "C" contact 62b. There is further provided a second timer circuit 64 having a delayed operation "C" contact 64a and an instant operation "C" contact 64b, a third timer circuit 66 having delayed operation "C" contacts 66a and 66b and a fourth timer circuit 68 having a delayed operation "C" contact 68a and a "C" contact 68b. The timer circuits 62, 64, 66 and 68 may be of conventional construction and, accordingly, need not be described in detail herein. The delayed operation "C" contacts associated with each of the timer circuits remain in their NC or NO states for a predetermined time after the energization of the respective timer circuit, as will be explained hereinbelow.

As shown, the 230 volt AC signal is coupled to the movable arms of a double-pole, single-throw "on-off" switch 69. As mentioned above, this switch, as well as all other manually operated switches, is actually located within the control panel 10 (FIG. 1) but, for the sake of simplicity, is shown within the timing control circuit 12. When the switch 69 is closed, the 230 volt AC signal is coupled across the input winding of the transformer 52 through the NC contact 58c of the relay 58 coupled in series with a pair of conductors 70 and the NC delayed operation "C" contact 68a of the timer circuit 68 coupled in series with a pair of conductors 71. This 230 volt AC signal is transformed into a 24 volt AC signal by the transformer 52 and applied through the diode 54 to one terminal of a push button stop switch 72. The stop switch, being shown in its normally closed state, couples the rectified input signal to one input terminal of a push button start switch 73.

With the momentary depression of the start switch 73, the rectified 24 volt AC signal is coupled through the start switch 73 to one input terminal of the relay 56, the other input terminal of the relay 56 being coupled to the opposite side of the output winding of the transformer 52. This energizes the relay 56 which, in turn, causes its associated "C" contact 56a to close and lock the relay into a permanent state of energization. As is known in the art, a capacitor may be connected across the relay 56 to insure that the relay does not deenergize too quickly upon the return of the start switch 73 to its normally open position. The energization of the relay 56 also causes its associated "C" contact 56b to close and its associated "C" contact 56c to open.

As best shown in FIG. 2C, the normally open terminal and the central arm of the "C" contact 56b are coupled in series with a 230 volt AC input signal and a main circuit breaker solenoid 74 located within the magnetic amplifier power supply 16 through a pair of conductors 75. Accordingly, the closing of the "C" contact 56c with the energization of the relay 56 causes the solenoid 74 to energize which, in turn, causes its associated circuit breakers 74a, 74b, and 74c to close and couple an applied 460/230 volt AC input signal to a transformer 76 of the supply 16. Although the principles of the invention described herein are applicable to solid-state weld power supplies, saturable reactor weld power supplies and the like, those power supplies employing magnetic amplifiers are preferred because they require low control and bias current levels and because of their inherent faster response to applied current levels. One commercially marketed weld power supply which has been used with success in the instant invention is the Vickers three phase constant current weld power supply.

The normally closed terminal and the central arm of the "C" contact 56c are coupled in series with a relay 77 and the output winding of a transformer 78 located within the high frequency control circuit 18 through a pair of conductors 79. As shown therein, a 230 volt AC voltage input signal is applied across a pair of input terminals 80 in the circuit 18 and coupled to the central arm of a "C" contact 82a associated with a relay 82, the primary winding of the transformer 78 and to the central arm of a "C" contact 77a associated with the relay 77. Accordingly, prior to the energization of the relay 56 in the control circuit 12, the relay 77 is energized inasmuch as a conductive path is provided between the relay 77 and the output winding of the transformer 78 through the "C" contact 56c. With the relay 77 energized, its "C" contact 77a, shown in its normally closed position, is closed to its normally open position to thereby create a conductive path between the 230 volt AC input signal and the relay 82. The energization of the relay 82 causes its associated "C" contact 82a to close to its normally open position and thereby open the conductive path between the input terminals 80 and a pair of valve actuating solenoids 84 and 86 and a timer circuit 88.

When the relay 77 is deenergized by the opening of the contact 56c, the "C" contact 77a returns to its normally closed position to thereby couple the input terminals 80 to a delayed operation "C" contact 88a of the timer circuit 88 and open the conductive path between the input terminals 80 and the relay 82. When the contact 82a returns to its normally closed position, one of the input terminals 80 is again coupled to the input side of the valve actuating solenoids 84 and 86, the other sides of the solenoids 84 and 86 being coupled together and to the other one of the input terminals 80 through a normally closed on-off switch 90. The energization of the valve actuating solenoids 84 and 86 operates, as shown in FIG. 1, to enable the valves 34 and 36 to open and thereby pass water and inert gas from their respective supply sources (not shown) to the welding torch 30.

The "C" contact 88a, as well as another "C" contact 88b of the timer circuit 88 are delayed operation contacts and do not close to their normally open positions for approximately 5 to 10 seconds after the energization of the timer circuit 88. This allows inert gas to enter the welding torch 30 to thereby purge the lines, hoses and the welding torch from any foreign matter and allows water to cool the welding torch 30. After the purging and cooling cycle, the contact 88a closes and couples the applied 230 volt AC signal to a second timer circuit 92 within the control circuit 18 and to the central arm of a delayed operation "C" contact 92a associated with the timer circuit 92. Because the contact 92a, as well as the other "C" contact 92b of the timer circuit 92, is a delayed operation contact, the 230 volt AC input signal is instantly coupled across the input winding of a transformer 94 with the closing of the contact 88a.

From the transformer 94, the high voltage signal is coupled across a spark gap 96 and the input winding of another transformer 98. A rheostat 100 is inserted in series with the gap 96 for the controlling the spark. The output winding of the transformer 98 is connected in series with the conductor 23 such that a spark will be created in the gap between the electrode 28 of the welding torch and the workpiece 32. The length of time that the high frequency voltage is applied across the spark gap 96 is controlled by the delayed operation of the contact 92a associated with the timer circuit 92. It has been found that a short duration high frequency signal, lasting for approximately one-half a second, is sufficient to spark the welding arc 26 between the electrode 28 and the workpiece 32. Preferably then, the contact 92a is opened approximately one-half a second after the timer circuit 92 is energized.

As mentioned above, the timer circuits 88 and 92 also include associated "C" contacts 88b and 92b respectively. The control arm of the "C" contact 88b is coupled to a 24 volt DC source while the normally open terminal of the contact 88b is coupled to the normally closed terminal of the contact 92b. The normally open terminal of the contact 92b is coupled to the output terminal of a current amplifier 102 located within the weld current control circuit 14 through a conductor 103, and the central arm of the contact 92b is connected to the control winding 104 of the power supply 16 through a conductor 105.

Accordingly, the delayed operation 88b contact of the timer circuit 88 closes at the same time that the delayed contact 88a closes and the 24 volt DC source is coupled through both "C" contacts 88b and 92b to the control winding 104 of the magnetic amplifier power supply. This establishes a current in the control winding 104 which tends to saturate the magnetic amplifier of the supply 16. As is generally known, the saturation of the magnetic amplifier operates to produce a large output current in the output winding 106 of the supply 16. This large current is coupled through the conductors 23 and 24 to the welding arc 24 (FIG. 1) and continues to flow until the delayed operation contact 92b is actuated to its normally open position. The contact 92b is adjusted to operate at the same time that the delayed operation contact 92a operates and, accordingly, operates approximately one-half second after the energization of the timer circuit 92. When the "C" contact 92b is actuated the 24 volt DC supply is removed from the control winding of the magnetic amplifier of the supply 16 and the current amplifier 102 of the weld current control circuit 14 is connected to the control winding 104 of the magnetic amplifier of the supply 16.

When the large current begins to flow in the output winding of the supply 16, the relay 38, located in the ground return conductor 24 of the welding circuit, becomes energized and its associated "C" contact 38a is actuated to the normally open position. The central arm and the normally open terminal of the contact 38a are connected through conductors 107 in series with the input terminal 50 in the timing control circuit 12 and the input terminal of the timer circuit 62 located in the control circuit 12. As conventionally practiced, a voltmeter 108 is coupled across conductors 23 and 24 for providing a visual readout of the voltage supplied by the power supply 16 and an ammeter 109 is provided for measuring the amount of welding current. Further included is a polarity reversing switch 110 for changing the polarity of the welding current if necessary.

As best seen, therefore, in FIG. 2A, the actuation of the contact 38a to its normally open position closes a conductive path between the timer circuit 62 and the 230 volt AC input signal applied to the input terminals 50 and 51 of the timing control circuit 12. The central arm and the normally open terminal of the delayed operation contact 62a of the timer circuit 62 are coupled in series with the timer circuits 64 and 66 and the input terminal 50 through conductors 111. The central arm and the normally open terminal of the instant operation contact 62b of the timer circuit 62 are coupled through conductors 112 in parallel with the "C" contact 58c of the relay 58 and in series with the delayed operation "C" contact 68a of the timer circuit 68. When the timer circuit 62 is energized, therefore, the contact 62b instantaneously closes an alternate conductive path between the 230 volt AC input signal and the primary winding of the transformer 52 through the delayed operation contact 68a of the timer circuit 68.

The delayed operation contact 62a is adjusted to operate after the proper welding temperature has been established so as to assure high quality weldments. It has been found that a delayed operation for about 6 to 10 seconds is sufficient for the purpose, and, accordingly, the contact 62a is set to operate approximately 6 to 10 seconds after the energization of the timer circuit 62. When the contact 62a is actuated to its normally open position, the timer circuits 64 and 66 are energized. The timer circuit 66 controls the length of the welding cycle, e.g., 150 seconds, and may be viewed as the welding cycle timer circuit. The control arm and the normally closed terminal of the delayed operation "C" contact 64a of the timer circuit 64 are connected through a pair of conductors 113 across the output of a pulse generator 114 located within the weld current control circuit 14 and, as will be explained hereinbelow, make it possible to automatically control the number of pulses applied to the control winding of the magnetic amplifier power supply 16 during each weld cycle. The central arm and the normally open terminal of the instant operation contacts 64b and 64c are connected through conductors 116, 117 in series with a 27 volt DC source 118 and the input terminals of the welding torch motor travel control circuit 20, the wire feed motor control circuit 22 and a pair of forward-reverse switches 120 and 122 associated with the circuits 20 and 22, respectively. The central arm and the normally open terminal of the delayed operation "C" contact of the timer circuit 66 are connected through connectors 123 in series with the input terminal of the relay 58 and the output winding of the transformer 52 through the diode 54 and the stop switch 72. The "C" contact 66a is adjusted such that it does not close to its normally open position until the completion of the welding cycle or for approximately 150 seconds.

When the contacts 64b, 64c are actuated to their normally open position by the energized timer circuit 64, a conductive path is created between the 27 volt DC source 118 and the motor control circuits 20 and 22. The welding torch motor travel control circuit 20 and the wire feed motor control circuit 22 are conventional and need not be described herein. It suffices that these circuits supply a variable current signal to the DC motors 42 and 44 to thereby control the speed at which the motor 42 drives the welding torch 30 around the workpiece 32 and the rate at which the filler wire 46 is fed into the welding arc 22 (FIG. 1). The forward-reverse switches 120 and 122 control the polarity of the current signals supplied to the motors 42 and 48, respectively. With the switches 120 and 122 in their normally open positions, the motor 42 drives the welding torch 30 around the workpiece 32 in a clockwise direction and the motor 44 feeds the filler wire 46 into the arc 26. With the switches 120 and 122 closed, the welding torch 30 is driven in a counterclockwise direction and the filler wise 46 is drawn up from the welding arc 26. As conventionally practiced, each of the single-pole switches 120 and 122 has associated therewith a relay (not shown) in the control circuits 20 and 22, respectively, for implementing the reversal in signal polarity.

Connected in parallel with the instant operation contact 64b is a push button switch 124 which is provided for momentarily actuating the motor control circuit 20 to thereby momentarily impulse the motor 42. Push button switch 125 is similarly provided to actuate circuit 22 to impulse motor 44. Depending upon the setting of the forward-reverse switches 120 and 122, the welding torch 30 will be momentarily driven in either a clockwise or counterclockwise direction and the filler wire 46 will be either fed into the arc 26 or taken up from the arc.

As shown in FIG. 2B, a positive 15 volt DC voltage signal is applied simultaneously to a common collector amplifier 126 and the pulse generator 114 and applied across the central arm and normally open terminal of the "C" contact 60b associated with the relay 60 through conductors 128. Coupled to the output of the common collector amplifier is a potentiometer 130 which couples the amplified 15 volt signal to the input terminal 131 of a control amplifier 132. The adjustment of the potentiometer 130 operates to control the low value of welding current produced by the magnetic amplifier power supply 26. The pulse generator 114 may be of conventional construction and need not be described in detail herein. However, one such pulse generator circuit employed with success in the instant invention includes a unijunction transistor, multivibrator arrangement adapted to generate 15 volt rectangular pulses at the desired frequency, for example, three cycles per second. For the unijunction transistor, multivibrator arrangement, a series connected push button switch 134-capacitor 136 circuit is provided for momentarily disabling the unijunction transistor. When the push button 134 is actuated, the pulse generator 114 is disabled because the charging capacitor 136 will not be able to charge up or be discharged through the unijunction transistor of the pulse generator 114. Any other rectangular pulse generator of controllable width and frequency will be effective.

Connected in parallel across the output terminals of the pulse generator 114 are a potentiometer 138, a current step switch 140 and the delayed operation "C" contact 64a of the timer circuit 64. A 15 volt pulse will be produced by the pulse generator 114 at a predetermined frequency so long as the current step switch 140 is manually actuated to its closed position or the delayed operation contact 64a of the timer circuit remains closed. If it is desired to automatically pulse the arc during all or part of the welding cycle, the contact 64a is adjusted such that it opens at the desired time after the energization of the timer circuit 64. If it is desired to manually pulse the arc during all or part of the welding cycle, the contact 64a is adjusted such that it opens immediately after the energization of the timer circuit 64 and the current step switch 140 is appropriately actuated. The potentiometer 138 together with a series connected second potentiometer 142 control the amplitude of the pulses generated by the generator 114 if both contacts 140 and 64a are open. If either one is closed, then only the potentiometer 142 controls the amplitude of the generated pulses. A manually operated pulse control switch 144 is coupled to the center tap of the potentiometer 142 for connecting the generated pulses of the input terminal 131 of the amplifier 132.

The nature of the pulses coming out of generator 114 are determined by the requirements of the welding process of the present invention. In the weld puddle, it is important for continuity of the weld that the solidification of the puddle take place in a continuous manner. At the same time, in welds on the under side of the workpiece, it is vital that heat not build up sufficiently to overcome the surface tension forces holding the puddle in place. Accordingly, the current supplied to the arc must rise and fall periodically to permit acceleration and deceleration of the solidification of the weld. However, the solidification must not stop at any time, as would happen if the current rose sharply at any point, or if it remained high for a significant portion of the pulse cycle. It is therefore vital that the current rise steadily to its high value. It is found that best results are obtained when the current rises and falls exponentially, i.e., the current rises in accordance with the formula $A(1-e^{-(t+t_0)/RC})$ and falls in accordance with the formula $B+De^{-t/RC}$, where $t$ is the time from $t_0$, the beginning of the rise or fall, $R$ and $C$ are the resistance and capacitance, respectively of the controlling pulse source, and $A$, $B$, and $D$ are constants determining the relative current levels. $C$ is generally accounted for by the integrating capacitance 115. In general, the time during which the pulse from generator 114 is rising will be less than the time during which it is falling, typically in the ratio of about 1:3 and both times will be less than the time necessary to rise or fall to the final value, so that in general, the current is always either rising or falling. However, it is acceptable to have some dwell at the lower current value. As a result of the foregoing, the solidification of the weld puddle proceeds in a continuous wave marked by accelerating and decelerating portions, the latter occurring on the rise of the current pulses. The pulse frequency may be generally from 1 to 10 cycles/sec., but the optimum is 2½ to 3 cycles/sec. Useful results have been obtained at one-third cycle/sec. One period is the inverse of the pulse frequency. The limits of high and low current levels toward which the current rises and falls, denoted by $A$ and $B$, vary depending on the type of metal and pipe thickness. In general $A:B$ is higher than 2:1, and may for some applications rise to over 10:1.

The central arm and the normally open terminal of the contact 60b associated with the relay 60 are coupled between the 15 volt DC signal power source and a potentiometer 146 located within the current control circuit 14. A movable tap 148 of the potentiometer is coupled to the input terminal of a slope amplifier 150. The slope amplifier 150, when activated, provides a ramp function output signal to the input terminal 131 of the amplifier 132 which opposes the polarity of the signals supplied by the pulse generator 114 and the common collector amplifier 126. Under normal operating conditions, this amplifier is only activated at the end of the total weld cycle, the amplifier operating to gradually reduce the magnitude of the current signals supplied to the magnetic amplifier power supply 16. This provides against pitting and weld porosity at the end of the weld cycle.

Accordingly, one terminal of the relay 60 is coupled to the input terminal 51 while the other terminal is connected to the central arm of the "C" contact 58a associated with the relay 58 and to one terminal of a normally open slope switch 152. If it is desired to decrease the amount of current supplied to the magnetic amplifier power supply 16 during the weld cycle, the switch 152 is actuated to the closed position to create a conductive path between the 230 volt AC input signal and the relay 60. The energization of the relay 60 causes its associated contact 60b to close and couple the 15 volt DC signal across the potentiometer 146 to the slope amplifier 150. It is significant that the potentiometer 146 be adjusted such that the amplifier is precluded from generating signals which will reduce the output weld current to a to below a value which is necessary to sustain the energization of the relay 38. If, however, it is not desired to reduce the amount of current supplied to the power supply 16 during the weld cycle, the slope switch 152 is not actuated and the amplifier 150 remains disabled until the end of the weld cycle.

During the weld cycle, then, the input terminal 131 of the control amplifier 132 is coupled to the pulse generator 114, the common collector amplifier 124 and the slop amplifier 150. Further connected to the input terminal 131 through a conductor 154 is the shunt resistor 40 located within the ground return lead 24 of the welding circuit. The signal supplied from the resistor 40 acts as a feedback signal to vary the gain of the amplifier 132 and compensate for any spurious changes in the welding current. The output signals of the pulse generator 114, the common collector amplifier 126 and the slope amplifier 150, as well as the weld current feedback signal, are added together in the amplifier 132 and supplied to the current amplifier 102. As mentioned above, the output terminal of the current amplifier 102 is connected through the delayed operation contact 92b of the timer circuit 92 in the high frequency control unit 18 only after the termination of the high voltage arc igniting signal.

Under normal operating conditions, the control winding 104 of the magnetic amplifier of the supply 26 is supplied with DC current, the level of which is proportional to the output current flowing in the output circuit of the weld power supply. This current flowing in the control winding partially saturates the magnetic amplifier of the supply 16 and thereby restricts the magnitude of the current supplied to the welding arc 26. By introducing periodic rising and falling current pulses produced by the weld current control circuit 14 into the control winding of the amplifier of the supply 16, the pulses having a polarity in-phase with the polarity of the normal current flowing therein, the magnetic amplifier will be intermittently saturated. This, in turn, will produce a periodic rising and falling pulsed current in the output circuit of the power supply and stabilize the weld puddle 26 regardless of the position of the welding torch 30.

At the end of the weld cycle, the delayed operation "C" contacts 66a and 66b of the timer circuit 66 close. Contact 66b stops the wire feed motor control circuit 22. Contact 66a couples the rectified 24 volt signal through conductors 123 to the relay 58. Energization of the relay 58 causes its associated contact 58a to create a conductive path between the input terminal 50 and the relay 60 through a pair of conductors 156. The energization of the relay 60 causes its associated contact 60b to close and couple the 15 volt DC signal to the slope amplifier 150. Moreover, the contact 60a is closed and the relay 58 is locked into a permanent state of energization through the conductors 123.

At the same time that delayed contact 66a closes, delayed contact 66b opens, thereby interrupting the operation of the wire feed motor 44, as the wire should not be fed into the weld during the final slope.

When the slope amplifier 150 is activated, it supplies a slope signal to the control amplifier 132 of opposite polarity to generator 114 which gradually reduces the signals into amplifier 132 from amplifier 126 and generator 114. This reduces the pulses proportionately, resulting in the output weld current gradually decreasing to the point where the arc is no longer sustained.

Concurrent with the energization of the relay 58, the timing circuit 68 is connected to the input terminal 50 through conductors 158 and the now closed contact 58b. The instant operation contact 68b locks timer 62 on so that momentary ceasing of current in relay 38 will not shut off timer 62 prematurely. The delayed operation "C" contact 68a of the timer circuit 68 is adjusted such that it is not actuated until the welding arc has been reduced nearly to zero. Empirically, it has been ascertained that delay of 6 to 10 seconds is sufficient. After this 6 to 10 second delay, the contact 68a is actuated to its normally open position and the conductive path between the input terminal 50 and the primary winding of the transformer 52 is opened. This removes the 24 volt rectified signal from the relays 56 and 58 and these relays are deenergized. The deenergization of the relay 58 opens the contact 58a and the relay 60 is deenergized. Contact 58b is also opened, which deenergizes timer 68, which in turn deenergizes timer 62 by opening contact 68b (it being assumed that relay 38 has been deenergized for lack of welding current). With the deenergization of timer 62, its delayed operation "C" contact 62a returns to its normally closed position and both timer circuits 64 and 66 are deenergized. Thereupon, contact 64b of timer 64 returns to its normally closed position and the torch motor control circuit 20 is turned off along with its motor 42.

Referring to FIG. 2C, the deenergization of the relay 56 causes its "C" contact 56b to open, the solenoid 74 to deenergize and the 460/230 volt AC input signal is thereby removed from the transformer 76 of the power supply 76. The actuation of the "C" contact 56c closes the conductive path between the transformer 78 and the relay 77 in the high frequency control circuit 18 and the relay 77 is thereby energized. The energization of the relay 77 closes the "C" contact 77a and the relay 82 is energized. When the relay 82 is energized, its associated "C" contact 82a closes and the 230 volt AC input signal is removed from the valve actuating solenoids 84 and 86 and also from the timer circuit 88. Deenergization of the solenoids 84 and 86 closes the flow of water and gas to the welding torch 30 through the valves 34 and 36 and the weld cycle is completed.

In operation, the "on-off" switch 69 is closed and the 230 volt AC input signal is coupled across the input winding of the transformer 52. Thereafter, the start switch 73 is momentarily depressed to energize the relay 56 which, in turn, activates the weld power supply 16 and causes the energization of the valve actuating solenoids 84 and 86 and the timer circuit 88 in the high frequency control circuit 18. After a 6 to 10 second cooling and purging cycle, the delayed operation "C" contact 88a of the timer circuit is closed and the 230 volt AC signal is coupled across the spark gap 96 to thereby ignite the welding arc 26 between the electrode 28 and the workpiece 32. The delayed operation "C" contact 88b is also closed and a 24 volt DC signal connected to the control winding 104 of the magnetic amplifier power supply 16. This saturates the magnetic amplifier of the supply and a momentary high level output welding current is produced. After approximately one-half a second, the 230 volt AC signal is removed from the spark gap 96, the 24 volt DC signal is removed from the control winding 104 of the supply 16 and the weld current control circuit 14 is connected to the winding 104 through the contact 92b.

The timer circuit 64 is energized approximately 6 to 10 seconds after the initial flow of the high level unidirectional output current to the welding arc 26. When this timer circuit is energized, it couples a 27 volt control signal to the welding torch motor travel control circuit 20 and the wire feed motor control circuit 22. The speed at which the welding torch travel motor 42 drives the welding torch 30 around a workpiece 32 coincides with a complete welding cycle such that the torch 30 completes one revolution around the workpiece 32 each welding cycle. At the end of the welding cycle, the duration of the cycle being controlled by the timer circuit 66, the wire feed motor 44 is deenergized and the slop amplifier 150 in the weld current control circuit 14 is actuated, producing a sloping output voltage signal having a polarity which opposed the pulsating output supplied by the pulse generator 114 and the steady state voltage supplied by the common collector amplifier 126. Upon the opening of contact 68a the timer circuits 64 and 66 are deenergized by the opening of the contact 62a of the timer circuit 62. The welding torch travel motor 42 is in turn deenergized. This completes the weld cycle.

Figure 4:
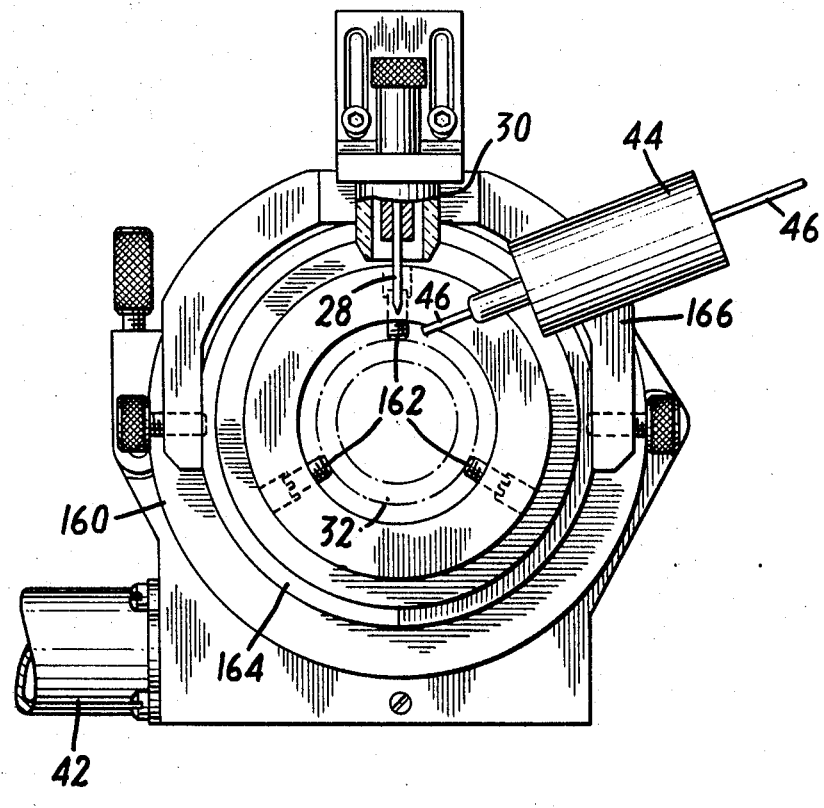
FIG. 4 is a schematic view partly in section showing a carriage for a torch and wire feeder according to the invention.

In FIG. 4 is shown a carriage 160 for use in welding a pipe in fixed position by means of the present system. A pipe 32 is inserted through the center of carriage 160 and fixed therein by four positioning screws 162, with the torch 30 positioned over the junction of pipe 32 with a second pipe (not shown). As is well known, the junction of the pipes may be square butt or machine beveled, and it may, if desired, be connected by a consumable weld insert, such as shown in U.S. Pat. No. 2,729,490. Carriage 160 is shown in greater detail in application Ser. No. 591,818. Filed Nov. 2, 1966 now U.S. Pat. No. 3,389,846, issued June 25, 1968, by Thomas Claffey, entitled "Automatic Pipe Welder" of common assignment with this patent, which application is incorporated by reference herein. As described therein, carriage 160 has mounted rotatably therewithin a split gear 164, which is rotated by a worm gear (not shown) driven by motor 42. A clamp 166 is firmly mounted on gear 164 and carries torch 30 therein in position to rotate around pipe 32 at a fixed distance therefrom. This distance may be adjusted by means described in the aforesaid patent of Thomas Claffey. Also carried on clamp 166 is the wire feed motor 44 carrying wire 46. Wire 46 is adjusted to feed into puddle 31 as previously described. Wire 46 may be mounted on a reel (not shown) or may be fed into motor 44 straight. Motor 44 may be disconnected if it is desired to consume a weld insert without wire feed or if it is desired to weld the joint as a square butt without wire feed. Although the system is especially suitable for fixed position pipe welding, it is adaptable to other types of welding joints for which a carriage can carry a torch around the workpiece.

It should be understood that the invention is susceptible to considerable modification and not limited to the above-described illustrative embodiment. Accordingly, all modifications and variations within the skill of the art are included within the spirit and intended scope of the invention as defined by the following claims.

We claim:

1. A pulsed arc automatic welding system comprising welding torch means, weld power supply means for supplying unidirectional output welding current to the electrode of the welding torch means to establish and sustain a welding arc between the electrode and a workpiece, and weld current control means comprising means for supplying a variable current signal and pulse generating means for supplying selectively spaced current pulses, together with the variable current signal, to the weld power supply means to thereby drive the weld power supply means to supply a variable output welding current having selectively spaced higher unidirectional current levels to the welding arc, wherein the pulse generating means comprises means for generating pulses of electrical current which rise in accordance with the formula $A(1-e^{t/t_0}+e^{t/RC})$, and fall in accordance with the formula $B+De^{t/RC}$ whereby the shape of the output current has the same form.

2. A pulsed arc automatic welding system comprising welding torch means, weld power supply means for supplying unidirectional output welding current to the electrode of the welding torch means to establish and sustain a welding arc between the electrode and a workpiece, weld current control means comprising means for supplying a variable current signal and pulse generating means for supplying selectively spaced current pulses, together with the variable current signal, to the weld power supply means to thereby drive the weld power supply means to supply a variable output welding current having selectively spaced higher unidirectional current levels to the welding arc, and feedback means coupled between the output of the weld power supply means and the weld current control means, whereby a portion of said output welding current is subtracted from the combination of the variable current signal and the spaced current pulses supplied to the weld power supply means to insure that the shape of the output welding current corresponds to the combination of the input variable current signal and the spaced current pulses.

3. A pulsed arc automatic welding system comprising welding torch means, weld power supply means for supplying unidirectional output welding current to the electrode of the welding torch means to establish and sustain a welding arc between the electrode and a workpiece, weld current control means comprising means for supplying a variable current signal and pulse generating means for supplying selectively spaced current pulses, together with the variable current signal, to the weld power supply means to thereby drive the weld power supply means to supply a variable output welding current having selectively spaced higher unidirectional current levels to the welding arc, valve means adapted to supply inert gas and water to the welding torch means, valve actuating means for actuating the valve means, first motor means for driving the welding torch means around the workpiece, travel control circuit means for energizing the first motor means and controlling the speed at which the motor means drives the welding torch means around the workpiece, second motor means for supplying filler wire to the welding arc, wire feed motor control circuit means for energizing the second motor means and controlling the rate at which the filler wire is supplied to the welding arc, timing control circuit means, the timing control circuit means comprising means for actuating the weld power supply means, means for actuating the travel control circuit means and the wire feed motor control circuit means, means for controlling the magnitude and frequency of the selectively spaced current pulses supplied by the weld current control means, feedback means coupled between the output of the weld power supply means and the weld current control means, and means for controlling the magnitude of the variable current signal, wherein the timing control circuit means comprises first timer circuit means responsive to the output current produced by the weld power supply means for actuating the travel control circuit means and the wire feed motor control means, means, second timer circuit means for controlling the magnitude and frequency of the selectively spaced current pulses supplied from the weld current control means to the weld power supply means and third timer circuit means for gradually decreasing the magnitude of the current supplied to the weld power supply means from the weld current control means a predetermined time after the actuation of the travel control circuit means and the wire feed motor control means.

4. A system according to claim 3 wherein the weld power supply means comprises a magnetic amplifier weld power supply having a control winding for controlling the magnitude of the variable output welding current.

5. A system according to claim 4 wherein the weld current control means comprises a current amplifier coupled to the control winding of the magnetic amplifier weld power supply, a common collector amplifier including variable output impedance means coupled to the current amplifier for supplying variable voltage signals to the current amplifier, a pulse generator responsive to the second timer circuit means and further coupled to the current amplifier for supplying selectively spaced voltage pulses to the current amplifier and a slope amplifier responsive to the third timer circuit means and further coupled to the current amplifier for supplying a sloping voltage signal to the current amplifier, the sloping voltage signal having a polarity opposite to the polarity of the signals supplied to the current amplifier by the common collector amplifier and the pulse generator.

UNITED STATES PATENT OFFICE
CERTIFICATE OF CORRECTION

Patent No. 3,584,185      Dated June 8, 1971

Inventor(s)   Leonard E. Mann et al.

It is certified that error appears in the above-identified patent and that said Letters Patent are hereby corrected as shown below:

Column 8, line 67, "to", second occurrence, should read -- value --. Column 10, line 51, "slop" should read -- slope --. Column 11, lines 36 and 37, the first of the two formulas should read $$A(1 - e^{-(t + to)/RC})$$

the second formula should read $$B + De^{-t/RC}$$

Column 12, line 32, cancel "means", second occurrence.

Signed and sealed this 16th day of May 1972.

(SEAL)
Attest:

EDWARD M. FLETCHER, JR.
Attesting Officer

ROBERT GOTTSCHALK
Commissioner of Patents